April 26, 1932. R. L. SCHMITT Re. 18,446

ARTIFICIAL TOOTH MOUNTING

Original Filed Dec. 10, 1926

Inventor
R. L. Schmitt.

By Edwin S. Clarkson

Attorney

Reissued Apr. 26, 1932

Re. 18,446

UNITED STATES PATENT OFFICE

RUDOLPH L. SCHMITT, OF DALLAS, TEXAS

ARTIFICIAL TOOTH MOUNTING

Original No. 1,674,922, dated June 26, 1928, Serial No. 153,763, filed December 10, 1926. Application for reissue filed June 25, 1930. Serial No. 463,797.

This invention relates to new and useful improvements in artificial tooth mountings for use in dental bridge work.

The object of the invention is to provide a mounting in the form of a yoke adapted to engage in the rear side of the tooth in such a manner as to effectively hold the tooth against displacement and to provide a metal support, which may be readily soldered or brazed to the bridge or other connection.

A particular object of the invention is to provide lugs in the mounting for engaging in notches in the tooth, whereby the tooth will become more securely fastened in the mounting when subjected to downward pressure.

Another object of the invention is to simplify the mounting as well as the tooth received therein.

A construction designed to carry out the invention will be hereinafter described, together with other features of the invention.

Figure 1:
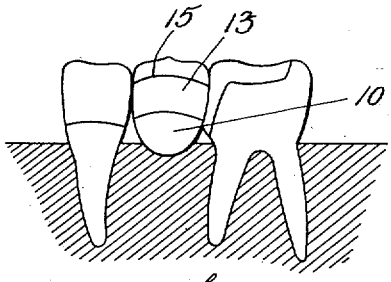
Figure 2:
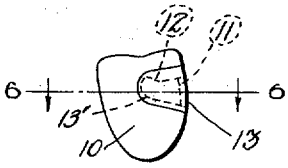
Figure 3:
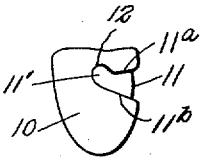
Figure 4:
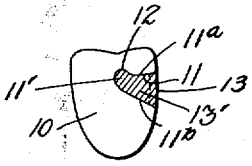
Figure 5:
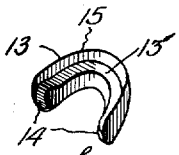
Figure 6:
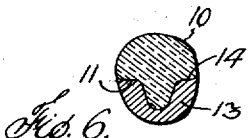

The invention will be more readily understood from a reading of the following specification and by reference to the accompanying drawings, in which an example of the invention is shown and wherein:

Fig. 1 is a back view of a bridge tooth, mounted in accordance with my invention, Fig. 2 is a side elevation of a tooth and its mounting, Fig. 3 is a side elevation of a tooth with the mounting removed, Fig. 4 is a similar view, the mounting being in section, Fig. 5 is a perspective view of the mounting, and Fig. 6 is a horizontal cross-sectional view on the line 6—6 of Fig. 2.

In the drawings the numeral 10 designates an artificial tooth which is suitably formed. On its posterior approximal portion the tooth is formed with a recess, or groove 11, extending across its lingual face and intersecting substantially L-shaped recess 11′ in each of its side faces, each of said recesses 11′ being tapered and inclined generally toward the labial and occlusal surfaces of the tooth. Each recess 11′, as shown, comprises a body portion terminating at its labial end in a socket 12, the body of the recess having an outer wall $11^a$ inclined labio-gingivally from the lingual face of the tooth and an inner wall $11^b$ inclined labio-occlusally from the lingual face of the tooth, and the socket 12 being offset laterally beyond the labio-gingivally inclined wall so as to form a shoulder at the intersection of said labio-gingivally inclined wall and the socket.

The mounting consists of a metal yoke 13 having a rib 13′ shaped to fit in the recess 11 and terminating in angular laterally projecting rounded lugs 14 at each end, adapted to engage in the recesses 11′ and their lateral sockets 12. The yoke may be formed to fit in the recess flush with the surface of the tooth, or it may have an upwardly extending flange 15 extending over the surface of the tooth.

It will be seen that the yoke forms a clamp and when made to snugly engage in the recess 11, will hold the tooth against displacement. This is particularly due to the lugs 14 and the sockets 12, whereby occlusal pressure on the tooth will merely force it into tighter engagement with the yoke and offset displacement. A much more effective fastening will be had by use of the lugs and sockets.

The mounting, when secured in the recess of the tooth, may be brazed or soldered to the bridge work, as is shown in Fig. 1, or secured in any other manner practiced by dentists. The mounting provides sufficient metal on each side of the tooth and in the rear, if necessary, to substantially connect it with the desired support; however, the mounting is concealed and the artificial tooth presents a natural appearance in front elevation.

Various changes in the size and shape of the different parts, as well as modifications and alterations, may be made within the scope of the appended claims.

What I claim, is:

1. An artificial tooth mounting including an artificial tooth having a circumferential recess in its posterior approximal portion extending to each side of the tooth and terminating in sockets disposed toward the occlusal portion of the tooth and having reduced entrance portions, and a mounting yoke band fitting said recess and having lugs formed with a reduced neck and interlocked in said sockets to prevent direct withdrawal therefrom.

2. An artificial tooth comprising a tooth body having a transverse recess in its lingual face and a recess in each of its approximal side faces intersecting the transverse recess, said side recesses being tapered and inclined generally toward the labial and occlusal surfaces of the tooth, each side recess having an occlusal wall inclined labio-gingivally from the lingual face of the tooth and a gingival wall inclined labio-occlusally from the lingual face of the tooth, and said side recesses terminating each in a socket offset laterally beyond the labio-gingivally inclined wall toward the occlusal face of the tooth so as to form shoulders at the intersection of said labio-gingivally inclined walls and the sockets, and a mounting yoke band fitting said transverse and side recesses and having lugs interlocked with the sockets and engaging the shoulders to prevent direct withdrawal therefrom.

3. An artificial tooth comprising a tooth body having a transverse recess in its lingual face and a substantially L-shaped recess in each of its approximal side faces intersecting the transverse recess, said side recesses having their body portions inclined generally toward the labial and occlusal surfaces of the tooth and their end portions projecting laterally from said body portions toward the occlusal face of the tooth so as to form shoulders at the intersection of said body portions and ends of the side recesses, and a mounting yoke band fitting in said recesses and having portions complementary to and engaging the shoulders to prevent direct withdrawal therefrom.

4. An artificial tooth and mounting comprising an artificial tooth having a transverse recess in its lingual face and a substantially L-shaped recess in each of its approximal side faces intersecting the transverse recess, said side recesses having their body portions inclined generally toward the labial and occlusal surfaces of the tooth and their end portions projecting laterally from said body portions toward the occlusal face of the tooth so as to form shoulders at the intersection of said body portions and ends of the side recesses, and a mounting having a rib provided with a transverse portion to fit within said transverse recess and forwardly projecting L-shaped end portions to fit within said side recesses, and formed to interlock with the shoulders to prevent direct withdrawal therefrom.

RUDOLPH L. SCHMITT.